United States Patent Office 3,708,449
Patented Jan. 2, 1973

3,708,449
FLUX COMPOSITION
Anthony D. Ippolito, Trenton, and Howard Van Arsdale, Robbinsville, N.J., assignors to NL Industries, Inc., New York, N.Y.
No Drawing. Filed July 13, 1971, Ser. No. 162,314
Int. Cl. C09j 3/26
U.S. Cl. 260—24
11 Claims

ABSTRACT OF THE DISCLOSURE

A solder reflux coating composition, suitable for use as a solder flux and in addition as a protective coating for the surface of solder preforms and the like, has been prepared, said composition consisting essentially of a mixture of rosin and polyurethane dissolved in an organic solvent, the amount of rosin present in said composition being from above 50 to 150 parts for each part of polyurethane and the amount of solvent being from above 40 to 70 parts for each 30–60 parts of rosin.

BACKGROUND OF THE INVENTION

In the soldering industry metals are joined together by various solder compositions which are compatible with the metals or alloys to be soldered. Solder is sold in various shapes such as bars, rods, and wires. In addition, solder may be formed into various shapes to fit the configuration of the metal pieces to be soldered. Such shapes are called solder preforms. The instant invention is particularly concerned with preparing a solder flux composition which also may be used as a coating on these solder preform pieces.

In this instant invention, the flux compositions must produce a coating on the solder preforms that has good fluxing action, is flexible, resistant to humidity, is scratch resistant and is able to adhere firmly to alloys and metals, such as for example lead-tin alloys, to produce a continuous even coating which is not tacky.

SUMMARY OF THE INSTANT INVENTION

A flux coating composition suitable for use as a solder flux and in addition useful as a protective coating for the surface of metals and alloys, for example lead and lead-tin alloy solder preforms, said compoition consisting essentially of rosin and polyurethane dissolved in an organic solvent, the amount of rosin present in said composition being from above 50 to 150 parts for each part of polyurethane and the amount of solvent being from 40 to 70 part for each 30 to 60 parts of rosin. The amount of rosin present in the composition is from above 30% to 60% while the amount of polyurethane present is from 0.25% to 2.0%. The organic solvent is present in the composition in amounts from above 40% to 70%.

The organic solvent used in the instant invention is selected from the group consisting of an aliphataic ketone, having from 3 to 8 carbon atoms, benzene and an alkyl substituted benzene having from 1 to 3 carbon atoms, a lower aliphatic alcohol having from 1 to 4 carbon atoms and mixtures thereof. Although the organic solvent may be composed of only one of these organic compounds, a particularly desirable solvent is a mixture of two or all three of these constituents. In such mixtures the solvent advantageously may consist of from 0% to 75% aliphatic ketone having from 3 to 8 carbon atoms, 0% to 50% benzene and an alkyl substituted benzene having from 1 to 3 carbon atoms and 0% to 100% aliphatic alcohol having from 1 to 4 carbon atoms, all of the percentages are expressed on a weight basis.

Such composition is particularly unique in that it possesses the following properties:

(1) it produces a continuous dry coating
(2) the dry coating is non-tacky
(3) the dry coating is flexible
(4) the coating is compatible with a rosin flux
(5) the coating prevents oxidation of the metal surface upon which it is applied
(6) the coating is not corrosive

DESCRIPTION OF THE PREFERRED EMBODIMENTS

A rosin coating usually produces a tacky and brittle coating on a metal surface. The dried coating cracks and peels and therefore does not protect the metal surface under the coating from oxidizing.

It has been found that a non-sticky and non-brittle coating for the solder preform may be prepared by using the composition of the instant invention. The presence of polyurethane renders the coating flexible while the solvent employed in the composition produces a coating composition which may be spread onto the metal surface of the solder preform to produce an even coat of a continuous film which does not dry too fast or too slow.

As stated above the organic solvent may consist of one or more of the following ingredients: an aliphatic ketone having from 3 to 8 carbon atoms, benzene and an alkyl substituted benzene having from 1 to 3 carbon atoms and an aliphatic alcohol having from 1 to 4 carbon atoms.

The aliphatic ketones contemplated in this instant invention are lower aliphatic ketones having from 3 to 8 carbon atoms which include acetone, methyl ethyl ketone, 3-pentanone, methyl isobutyl ketone, methyl propyl ketone, methyl isopropyl ketone, methyl cyclohexyl ketone and the like.

The alkyl substituted benzenes having from 1 to 3 carbon atoms which may be used include benzene, toluene, xylene, mesitylene, ethyl benzene, cumene and the like.

The alcohols used are the lower aliphatic alcohols, having from 1 to 4 carbon atoms which include methyl, ethyl, propyl, isopropyl, butyl, isobutyl, sec-butyl and the like.

The polyurethane used in the instant composition is a polyol diisocyanate which is the reaction product of a polyol polyester with the di-isocyanate. This polyurethane is flexible and non-tacky. It is compatible with rosin for soldering operations. The polyurethane also is capable of being cured at room temperature up to 100° C. within thirty (30) minutes.

In order to describe the composition of the instant invention more fully, the following examples are presented:

EXAMPLE I 30 grams of methyl ethyl ketone were added to a closed container under agitation.

50 grams of ground rosin were added to the ketone, followed by the addition of 6 grams of toluol, 13 grams of methyl alcohol and 0.5 gram of polyurethane. The polyurethane used in this and the following examples is a polyester polyol diisocyanate composition prepared as sold by Baker Castor Oil Company as Baker EC275X. This particular polyurethane is an isocyanate terminated reaction product of a castor oil based polyol, a polyalkylene glycol and toluene di-isocyanate. This mixture was agitated for 3 hours. After mixing the coating composition of the instant invention was obtained.

When this solution was applied onto the surface of a solder preform of lead and allowed to dry, the dried coating that formed was non-tacky, flexible and continuous.

Upon subjecting the coated solder preform to a humidity chamber for 2 weeks at 80° F. and 80% relative humidity, no deterioration of the surface coating was observed. The protective coating by itself is useful as a flux for the solder preform and in addition is compatible with common rosin flux systems. The coating does not have to be removed prior to soldering.

EXAMPLES 2–5

In these examples the procedures of Example 1 was repeated except that various amounts of reagents were used in forming the coating composition.

The various ingredients are listed as follows:

| Examples | 2 | 3 | 4 | 5 |
|---|---|---|---|---|
| Rosin, percent | 40 | 57 | 50 | 50 |
| Methyl alcohol, percent | 23 | 6 | 30 | 30 |
| Methyl ethyl ketone, percent | 30 | 30 | 13.5 | 13.5 |
| Toluol, percent | 6.5 | 6.5 | 5.5 | 6.0 |
| Polyurethane, percent | 0.5 | 0.5 | 1.0 | 0.5 |

These solutions also formed durable protective coatings on metal surfaces in addition to forming a solder flux composition on the metal surface.

EXAMPLES 6–7

In these examples the procedure of Example 1 was repeated except that the solvents used were modified. In Example 7 the solvent used was a mixture of methyl ethyl ketone and methyl alcohol while the Example 8 only methyl alcohol was used as a solvent.

The various ingredients are listed as follows:

| Examples | 6 | 7 |
|---|---|---|
| Rosin, percent | 50 | 50 |
| Methyl alcohol, percent | 25 | 49 |
| Methyl ethyl ketone, percent | 24.5 | |
| Polyurethane, percent | 0.5 | 0.1 |

Again durable coatings were formed by using these solutions on metal surfaces.

In all of these examples, the coating after exposure to 80% relative humidity at 80° F. for 2 weeks were durable and continuous. No deterioration of the surface was observed. The coating also was compatible with a rosin flux soldering operation. The coated solder preform also may be soldered directly without using any additional flux if desired.

While this invention has been described and illustrated by the examples shown, it is not intended to be strictly limited thereto, and other variations and modifiuations may be employed within the scope of the following claims:

We claim:

1. A solder flux coating composition suitable for use as a solder flux and in addition as a protective coating for solder preforms and the like, which produces continuous and durable coatings on the solder preform, said composition consisting essentially of rosin, polyurethane and an organic solvent, said polyurethane being the reaction product of a polyol and a di-isocyanate which is flexible and non-tacky and compatible with rosin for soldering operations and is capable of being cured at room temperature up to 100° C. within thirty minutes, said solvent selected from the group consisting of a lower aliphatic ketone having from 3 to 8 carbon atoms, benzene and an alkyl substituted benzene in which the alkyl group contains from 1 to 3 carbon atoms, and an aliphatic alcohol having from 1 to 4 carbon atoms and mixtures thereof, said rosin being present in amount from above 30% to 60%, polyurethane in amount from 0.25% to 2.0%, and the organic solvent in amount from above 40% to 70%, all of the percentages expressed on a weight basis.

2. Composition according to claim 1 in which there are from above 50 to 150 parts of rosin for each part of polyurethane.

3. Composition according to claim 1 in which the organic solvent is an aliphatic alcohol having from 1 to 4 carbon atoms.

4. Composition according to claim 3 in which the aliphatic alcohol is methanol.

5. Composition according to claim 1 in which the organic solvent is a mixture of an alkyl substituted benzene in which the alkyl group contains from 1 to 3 carbon atoms and a lower aliphatic ketone having from 3 to 8 carbon atoms.

6. Composition according to claim 1 in which the polyurethane is the reaction product of a polyol polyester with a di-isocyanate, said reaction product being flexible and non-tacky, compatible with rosin for soldering purposes and capable of being cured at room temperature up to 100° C. within thirty minutes.

7. Composition according to claim 5 in which the alkyl substituted benzene is toluol and the lower aliphatic ketone is methyl ethyl ketone.

8. Composition according to claim 1 in which the organic solvent is a mixture of a lower alphatic ketone, an alkyl substituted benzene and a lower aliphatic alcohol.

9. Composition according to claim 8 in which the lower aliphatic ketone is methyl ethyl ketone, the alkyl substituted benzene is toluol and the lower aliphatic alcohol is methanol.

10. Composition according to claim 9 in which the amount of methyl ethyl ketone in the organic solvent is from 0% to 75%, the amount of toluol is from 0% to 50% and the amount of methanol is from 0% to 100%, all of the percentages based on the weight of the solvent.

11. Composition according to claim 1 in which the polyurethane is an isocyanate terminated reacted product of a castor oil based polyol, a polyalkylene glycol and toluene di-isocyanate.

References Cited

UNITED STATES PATENTS 3,242,230   3/1966   Habib _____ 260—24

DONALD E. CZAJA, Primary Examiner

W. E. PARKER, Assistant Examiner

U.S. Cl. X.R.

106—240; 260—77.5 R